Patented July 12, 1938

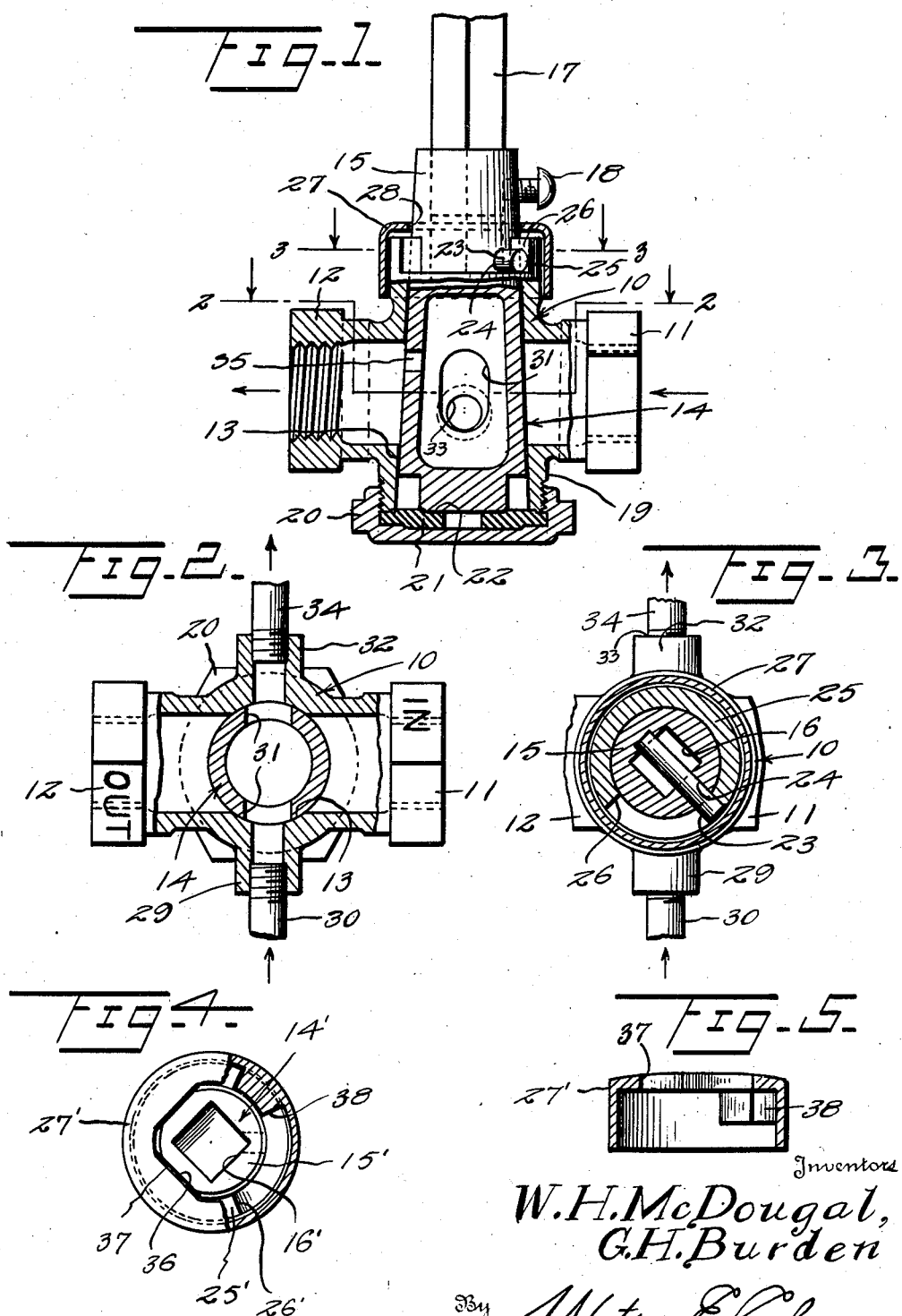

2,123,655

UNITED STATES PATENT OFFICE 2,123,655

STOP AND WASTE VALVE

Wellington H. McDougal and George H. Burden, Little Rock, Ark.

Application November 17, 1934, Serial No. 753,524
Renewed December 15, 1937

1 Claim. (Cl. 251—110)

This invention relates to stop and waste cocks or valves and has for an important object thereof the provision of a valve which may be connected to a main liquid supply line such as a cold water line and may also have portions thereof connected to cold and hot water service lines so as to drain the water from the service lines when the main supply line has been cut off.

Another object of this invention is to provide in a service valve of this kind means whereby the valve inside will turn easily, the turning of the valve in either open or closed position being such as to cause a slight loosening of the valve as against a tightening of the valve structure in valve constructions at present available.

A further object of this invention is to provide an inverted tapered valve structure and means for attaching an operating member to the reduced end rather than to the enlarged end of the valve so that the pressure applied to the valve in opening or closing will inherently tend to loosen the valve rather than to tighten the valve and thereby make the valve stick as where the handle or operating member is attached to the larger end of the valve.

A still further object of this invention is to provide in a valve structure of this type means whereby during the assembly of the valve parts, the parts will be correctly assembled, the valve structure being such as to prevent the incorrect assembly as is the case in drain valves at present available.

Still another object of this invention is to provide a service valve which may be connected to both hot and cold service water lines so that when it is desired to cut off the water supply to a house or building, it is only necessary to turn off one valve and the turning of this valve will open the drains to both the hot and cold water systems and thus permit the water in both of these systems to drain out and prevent freezing of the pipes.

The above and various other objects and advantages of this invention will in part be described and in part be understood from the following detailed description of the present preferred embodiment, the same being illustrated in the accompanying drawing wherein:

Figure 1 is a vertical section partly in detail of a valve constructed according to the embodiment of this invention.

Figure 2 is a fragmentary sectional view taken on the line 2—2 of Figure 1.

Figure 3 is a sectional view partly in detail taken on the line 3—3 of Figure 1.

Figure 4 is a top plan view partly cut away and in section of a modified form of stop means for the valve disclosed in Figure 1.

Figure 5 is a vertical section taken substantially through the center of the modified form of cap structure shown in Figure 4.

Referring to the drawing wherein like numerals of reference designate corresponding parts throughout the several views, the numeral 10 designates generally a valve housing or casing provided at one side with a boss 11 having a threaded bore therein which constitutes the intake of the housing 10 and at a point diametrically opposed to the boss 11 the housing 10 has a second boss 12 having a threaded bore therein and constituting an outlet for the housing or casing 10. The boss 11 is adapted to be connected to a liquid supply line and preferably to a main water line and the boss 12 is adapted to be connected to a service pipe line which is extended throughout the building. The casing or housing 10 has a valve seat 13 therein which intersects the opening through the housing from the inlet side 11 to the outlet 12 and a tapered valve 14 is mounted in the housing 10 and engages the tapering seat 13.

This valve 14 is mounted with the smaller end uppermost and the smaller end is extended upwardly through the housing 10, as at 15, which extended portion is provided with an angular recess 16 in which an operating member 17 in the form of a handle or the like may be disposed and secured by means of a set screw 18. The lower end of the housing 10 has a threaded boss 19 on which a cap 20 is mounted and this cap 20 receives a gasket 21 which seals the cap 20 and which also engages against the lower end 22 of the valve member 14. This gasket yieldably holds the valve 14 against the seat 13.

The stem portion 15 of the valve member 14 has a stop pin 23 extending outwardly therefrom and this stop pin 23 is mounted in an opening 24 in the stem 15 which does not extend all the way through the stem 15 so that the pin 23 will only extend out of one side of the stem 15. The housing 10 is provided at its upper end with an annular flange 25 having a segmental recess 26 in which the pin 23 engages so that the valve 14 may only be turned at substantially a quarter turn from opening to closing position.

A cap or flanged collar 27 having an axial opening 28 engaging loosely about the stem 15 covers the stop pin 23 and engages over the outside of the annular flange 25. The cap 27 is disposed between the set screw 18 and the upper end of the housing 10 so that the cap 27 cannot slide off of the valve and will at all times enclose the pin 23 which is only loosely mounted in the recess 24.

The housing 10 on one side thereof at substantially right angles to the bosses 11 and 12 is provided with a boss 29 having threads in which a drain pipe 30 is adapted to be mounted and the hole through the boss 29 communicates with the outlet port 31 of the valve 14. The housing 10 at substantially a diametrically opposed point to the boss 29 is also provided with a second boss 32 having a threaded opening 33 and this opening 33 is adapted to receive a drain pipe 34. The drain pipe 34 is adapted to be connected to a suitable source of carry-off means such as a sewer or the like, whereas the drain pipe 30 is preferably adapted to be connected to the lowermost point of a hot water system and is open at all times to this hot water system so that when the valve member 14 is turned so as to swing the discharge port 31 in register with the opening 30 in the boss 29, the water in the hot water system will pass through the valve 14 and out through the discharge pipe 34. The valve member 14, as will be noted from Figure 1, is preferably hollow and in addition to being provided with an opening transversely therethrough for the passage of water, the valve 14 is provided with a drain opening 35 which is disposed above the line of the two bosses 29 and 32 and this drain opening 35 when the valve 14 is closed, is adapted to permit the passage of water back from the service pipe connected to the boss 12 through the valve opening 35 and the opening 31 and then out through the discharge pipe 34.

As will be noted from Figures 4 and 5 of the drawing, the modified form of valve structure therein disclosed includes a valve member 14' having a stem 15' provided with a substantially rectangular recess 16' in which an operating member is adapted to be disposed. This valve structure includes a stem 15' which is provided with at least two flat faces 36 and the cap 27' is provided with complementary flat faces 37 on the inside thereof so that the cap 27' may only be placed on the stem 15' in one position. The flange 25' of the valve housing 10 has a segmental cut-out portion or recess 26' and a lug or boss 38 is made integral with the cap 27' and moves in this segmental recess 26' so as to limit the turning movement of the valve stem 14'.

In the use and operation of the valve structure hereinbefore described, the boss 11 is adapted to be connected to the main water supply line and the boss 12 connected to the service line. Normally the valve member 14 will be open so that water or other liquid may pass through the opening 31 in the valve member 14. In this open position, the openings in the bosses 29 and 32 will be closed and the opening 35 in the valve 14 will be to one side of the main opening through the valve housing 10 and being above the bosses 29 and 32, no water entering the interior of the valve member 14 will pass out through the bosses 29 and 32.

When it is desired to shut off the main supply line as where the occupants of a building leave the building and cut off the water in the water system, the valve member 14 may be turned to closed position and in this position, which is shown in Figure 1, the drain opening 35 will confront the service connection 12, thereby permitting water from the service lines in the building to flow back through the opening 35 into the valve 14. When the opening 35 confronts the service connection 12, the discharge openings 31 in the valve member 14 will register with the opposed drain members 29 and 32. The drain member 30 being connected to a hot water system and at all times open when the valve 14 is turned to closed position, the openings 31 in the valve will permit the water in the hot water system to flow back through the drain pipe 30 and out through the drain 34 at the same time that the cold water in the cold water system flows back through the drain opening 35.

It will be obvious from the foregoing that in a dwelling, it will not be necessary to provide separate drain valves for the several water systems in order to cut off the flow of water in the systems and at the same time provide means whereby the water in the systems will be drained so as to prevent freezing of the water in the pipes and the consequent splitting of the pipes.

What is claimed is:—

A valve comprising a casing having a straight passage therethrough and provided with a tapered valve seat intersecting said passage, said casing also having opposed openings communicating with said passage, a hollow tapered valve engaging said seat and having the large end thereof substantially flush with the large end of the seat, said valve having a passage therethrough adapted to aline with the passage in the casing when the valve is in open position and also having a bleeder opening at right angles to said valve passage and communicating therewith, the opposite ends of said valve passage registering with said opposed openings when the valve is in closed position, the reduced end of the valve having a stem receiving opening therein and also having a transversely disposed stop pin receiving opening in one side thereof, an upstanding segmental flange carried by the casing about the projecting portion of the valve, a pin loosely disposed in the transverse opening of the valve projecting outwardly between the ends of the flange, a cap enclosing the flange and pin for holding the pin against movement, a cap threaded onto the casing at the enlarged end of the valve, a yieldable gasket in the cap engaging against the large end of the valve, and indicia on the casing adjacent the opposite ends of the passage whereby to facilitate the correct positioning of the valve on a pipe.

WELLINGTON H. McDOUGAL.
GEORGE H. BURDEN.